Nov. 4, 1969

H. GOLDEN 3,476,496

PLASTIC SADDLE AND METAL MOUNTING ROD AND METHOD OF MAKING SAME

Filed Aug. 1, 1968

INVENTOR
HARRY GOLDEN

BY Arnold, Roylance,
Kruger & Durkee
ATTORNEYS.

Nov. 4, 1969   H. GOLDEN   3,476,496
PLASTIC SADDLE AND METAL MOUNTING ROD AND
METHOD OF MAKING SAME
Filed Aug. 1, 1968   2 Sheets-Sheet 2

INVENTOR
HARRY GOLDEN

BY Arnold, Roylance,
Kruger & Durkee
ATTORNEYS

United States Patent Office 3,476,496
Patented Nov. 4, 1969

3,476,496
PLASTIC SADDLE AND METAL MOUNTING ROD AND METHOD OF MAKING SAME
Harry Golden, New York, N.Y., assignor to Ideas for Auto and Bike Specialties, Inc., a corporation of New York
Continuation-in-part of application Ser. No. 658,219, Aug. 3, 1967. This application Aug. 1, 1968, Ser. No. 749,515
Int. Cl. B62j 1/00
U.S. Cl. 297—195    7 Claims

ABSTRACT OF THE DISCLOSURE

A combined plastic saddle and metal mounting rod wherein the saddle includes a depending collar portion in surrounding engagement with the uppermost end of the rod. The uppermost end is configured in a non-circular shape to prevent relative rotation between the rod and the saddle and to prevent relative movement between the rod and the saddle axially of the rod.

---

This application is a continuation-in-part of my copending application Ser. No. 658,219 filed Aug. 3, 1967.

This invention relates to seating arrangements for small vehicular devices such as bicycles, tricycles, or the like, and more particularly, it relates to an improved combination of a plastic saddle with a metal mounting rod therefor.

Until recent times, seats for bicycles, tricycles and other small vehicular devices were customarily fabricated of a metallic material and were connected with the vehicular frame by means of a metal mounting rod. In such arrangements, it was quite simple to connect the seat and rod together by any well known metal joining technique, such as welding or the like. In more recent times, however, it has been found that plastic can be more readily used to make the seats or saddles for bicycles, tricycles and other small vehicular devices. In fact, plastic has now come to be the preferred material because of its many inherent factors such as ease of high speed production, relative cheapness, ability to withstand denting, bending or other deforming, and the attractive appearance thereof.

Nevertheless, even though the use of plastic saddles has become relatively popular and desirable in recent times, such plastic saddles must nevertheless be mounted upon the conventional metal mounting rods which extend upwardly, usually at an angle, from the frame of the vehicular device. In attempting to assemble such plastic seats with their metal mounting rods, certain problems and difficulties have arisen. When attempts were made to assemble the plastic saddle and metal mounting rod by means of a nut and bolt arrangement, it was found that in a short time, the plastic material tended to deform to such a degree that the nut and bolt no longer provided a tight fit between the saddle and the mounting rod. When this occurred, there was a tendency for the seat to "jiggle" on the rod, thereby creating a potentially unsafe condition, and in any event, an undesirable one. Certain other attempts were made to directly connect the metal mounting rod with the plastic material of the saddle by means of frictional engagement or the like, and without the use of such connecting expedients as nuts and bolts, but under such circumstances it was discovered that after a short time, the plastic material would loosen from engagement with the metal mounting rod so that the saddle itself could be removed merely by lifting the same axially off the rod.

It must be recognized and remembered that plastic saddles of this type are primarily utilized on toys and vehicles for small children, and as a result, the saddle is often subjected to rocking, banging and other force factors which could and do serve to deform the plastic material somewhat. If the deformation of the saddle plastic material occurs to a degree sufficient to loosen the same from contact with the metal mounting rod, then the saddle itself is no longer stable and the likelihood of a potential injury occurs.

With the foregoing in mind, it is, therefore, an object of the present invention to overcome the shortcomings and deficiencies previously encountered in attempting to assemble a plastic saddle and a metal mounting rod, and to provide, instead, an improved assembly thereof.

Another object of the present invention is to provide a plastic saddle and a metal mounting rod connected and assembled in such a manner that relative rotation between the saddle and the rod cannot occur, even after continued use.

Another object of the present invention is to provide a plastic saddle and a metal mounting rod combined and assembled in such a manner that relative movement between the saddle and the rod, axially of the rod, cannot occur, even after continued use.

Another object of the present invention is to provide an improved method for manufacturing and assembling a plastic saddle and a metal mounting rod.

Further objects of the present invention include the provision of (a) a combination saddle and rod which can be inexpensively produced; (b) a combination saddle and rod, of diverse materials, wherein a tight and continuous engagement of the parts with one another can be maintained; (c) a combined plastic saddle and metal mounting rod assembly which is capable of performing its function as a seating arrangement for extended periods of time, without in any way loosening or otherwise becoming deformed; (d) a simple and efficient method for assembling a plastic closure with a metal mounting rod; and (e) a method whereby a metal mounting rod can be assembled to a plastic saddle at the same time that the saddle itself is formed.

Other objects, advantages and salient features of the present invention will become apparent from the following detailed description, which, taken in conjunction with the annexed drawings, discloses a preferred embodiment thereof.

Referring to the drawings.

Figure 1:
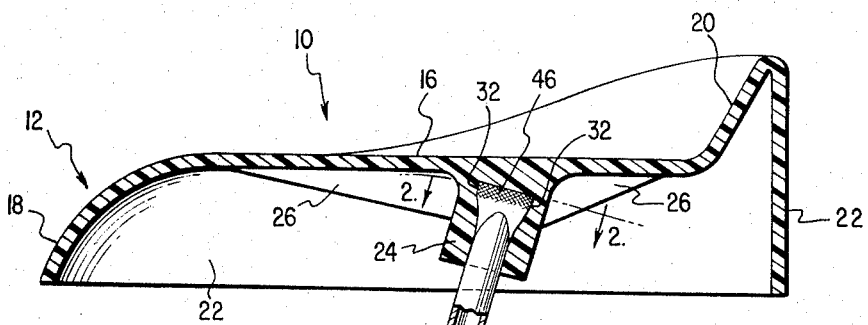
FIGURE 1 is a sectional view of a combined plastic saddle and metal mounting rod, in accordance with the principles of the present invention.
Figure 2:
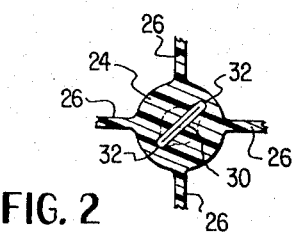
FIGURE 2 is a sectional view taken substantially along the line 2—2 of FIGURE 1.

With continued reference to the drawings, there is shown in FIGURE 1 thereof a combination generally designated 10 which includes a plastic saddle generally designated 12 assembled with a metal mounting rod generally designated 14.

The seat or saddle 12 can be fabricated of any suitable plastic material and is preferably fabricated of one which is susceptible to formation by injection molding. The saddle 12 includes a central flattened portion 16 curved downwardly at its forward end as indicated at 18 and curved upwardly at its rear edge as indicated at 20. While a plan view of the saddle is not shown, it will be understood and appreciated that the shape thereof corresponds to the conventional shape for items of this type. A depending peripheral skirt 22 surrounds the saddle and is formed integrally with the remainder thereof.

Additionally, the saddle includes a substantially cylindrical depending collar portion 24 which projects downwardly from the underside of the central portion 16 of the saddle. If desired, a series of strengthening or reinforcing ribs 26 can extend between the collar portion and the underside of the central portion 16. Preferably, the collar portion 24 is disposed at a slight angular, forwardly extending position, since, in the usual instance, the rod 14 extends upwardly from the frame of the vehicular device at an angle.

Considering the rod 14, it will be understood that the same can be fabricated of any suitable metallic material and is preferably formed as a tubular rod of cylindrical configuration. The walls of the rod can be designated 28. The rod 14 includes an uppermost end portion which is configured in a non-circular shape and is disposed within the collar portion 24 of the saddle. Specifically, the uppermost end portion of the rod 14 includes a flattened portion 30 created by squeezing closed the walls 28 at one end of the tube. Thus, the thickness of the flattened portion 30 is substantially equal to twice the thickness of the walls 28 of the metal rod 14. This squeezing or flattening of the end of the metal rod also causes the flattened end 30 to have a width in excess of the diameter of the remainder of the rod 14. In other words, the flattened portion 30 has opposed edges 32 which are spaced apart from one another by a distance which exceeds both the internal and the external diameter of the lower portion of the rod 14.

The flattened portion 30 of the rod is disposed, in contacting disposition, within the collar portion 24 of the saddle, in a manner to be presently described. As a result of such an arrangement, the flattened portion 30 prevents any relative rotation from occurring between the saddle 10 and the rod 14. Similarly, due to the fact that the thickness of the flattened portion exceeds the thickness of the remainder of the rod, and due to the fact that this flattened portion is embedded tightly within the collar portion 24, the rod cannot be withdrawn axially out of the collar. This therefore means that no relative movement between the saddle 12 and the rod 14 can occur, axially of the rod 14.

Figure 3:
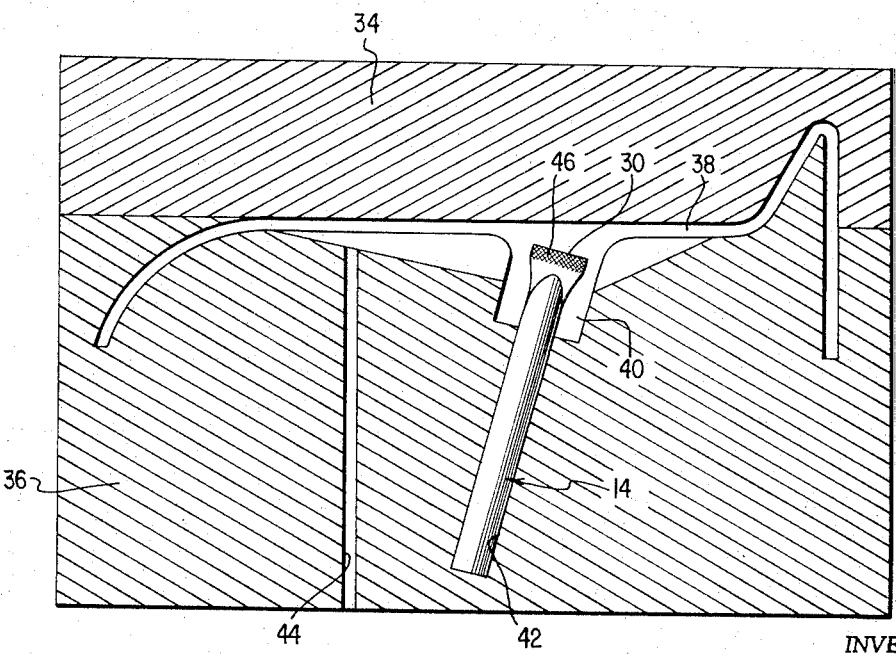
FIGURE 3 is a sectional view through a mold for manufacturing the plastic saddle, illustrating the manner in which the method of the present invention can be performed.

For an understanding of the manner in which the rod 14 and saddle 12 can be assembled with one another, in a single forming operation, let attention be directed to FIGURE 3. In FIGURE 3, a pair of separable mold halves 34 and 36 are provided, and when these mold halves are closed, they serve to define a cavity 38 corresponding substantially to the shape of the saddle 12. Specifically, the cavity 38 includes a substantially cylindrical recess 40 therein which serves to create the collar portion 24. A blind end bore 42 is formed in the mold half 36 in communication with the recess 40. This means that the rod 14, once the end 30 thereof has been flattened, can be inserted into the bore 42 when the mold halves are separated. When the mold halves are then closed in the manner shown in FIGURE 3, fluent plastic material can be introduced into the cavity 38 through an aperture 44. Preferably, the mold halves 34 and 36 are assembled in the injection molding machine so that the plastic material can be introduced under pressure through the bore 44. This plastic material then fills the cavity 38 including the recess portion 40 thereof. In other words, the plastic material completely surrounds the uppermost end portion of the rod 14. When the plastic solidifies and the mold halves are once again separated, the combination saddle 12 and attached rod 14 can be removed from the machine and the rod will be tightly assembled with the saddle in the manner previously described.

In order to provide an even more satisfactory embedding of the uppermost end of the rod into the collar portion of the saddle, at least the flattened portion 30 of the rod can be knurled, staked or otherwise machined as shown at 46 along the flattened side portions thereof. This causes a series of alternately raised and depressed portions which promote close fitting and frictional engagement between the metal of the rod and the plastic of the saddle due to the fact that the plastic material actually enters the small depressions.

The flattened end portion of the rod may be created in any suitable manner, as by squashing the end of the rod in a press, vise, clamp or other suitable implement.

Figures 4, 5:
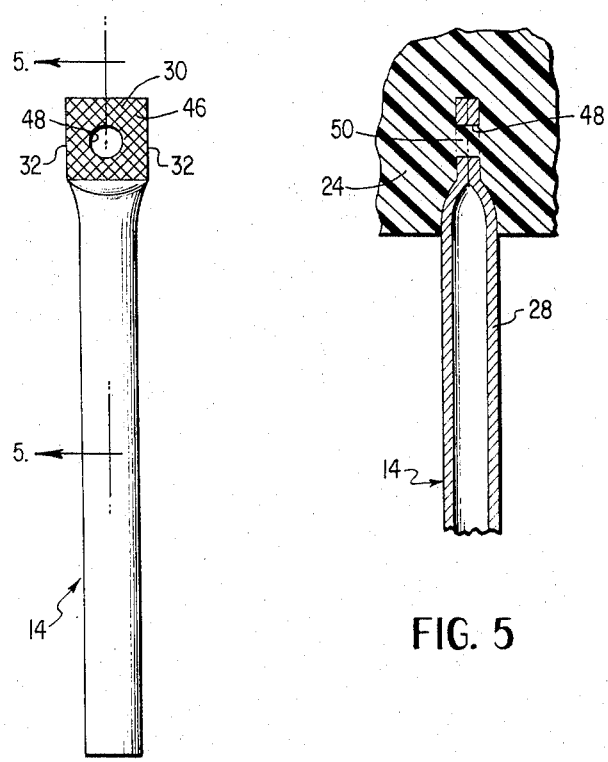
FIGURE 4 is an elevational view of a modified form of metal mounting rod.
FIGURE 5 is a sectional view taken along line 5—5 of FIGURE 4, with the rod end embedded in the depending plastic collar of the saddle.

A modified form of metal mounting rod 14 is shown in FIGURE 4, wherein the length of the flattened portion 30 is axially extended and wherein a transverse aperture 48 is formed centrally within the flattened portion. The purpose of providing the aperture 48 is apparent by reference to FIGURE 5 wherein it will be seen that the plastic material of the collar portion 24 flows through the aperture 48 during the assembly process to form a plastic pin 50 integral with the remainder of the collar 24. This plastic pin 50 thus serves to further secure the rod 14 to the saddle 12 in such a manner that the rod cannot loosen even if the saddle is rocked or twisted.

After reading the foregoing detailed description, it will be apparent that the objects set forth at the outset of the specification have been successfully achieve by the present invention.

Accordingly, what is claimed is:

1. In the combination of a plastic saddle and a metal mounting rod therefor, the improvement wherein said saddle includes a depending collar portion in surrounding engagement with the uppermost end portion of said rod, said uppermost end portion being embedded into the plastic of the collar portion and being configured in a non-circular shape which prevents relative rotation between said rod and said saddle and which prevents relative movement of said rod and said saddle axially of said rod.

2. The improvement defined in claim 1, wherein said non-circular shape is a flattened portion at the end of said rod.

3. The improvement defined in claim 2, wherein said rod is a tubular rod having a given diameter and wherein said flattened portion has a thickness substantially equal to twice the thickness of the walls of said tubular rod.

4. The improvement defined in claim 3, wherein the width of said flattened portion exceeds said given diameter.

5. The improvement defined in claim 2, wherein said flattened portion is provided with a series of alternately raised and depressed portions which promote a frictional engagement between said flattened portion and said collar.

6. The improvement defined in claim 1 wherein said uppermost end portion includes a transverse aperture, said plastic of said collar portion extending through said transverse aperture to further prevent relative movement between said saddle and said rod.

7. In the method of manufacturing a preassembled plastic saddle and metal mounting rod, the steps comprising:
  providing a mold having separable mold portions which, when closed, create a cavity corresponding to the desired shape of said saddle;
  said cavity including a substantially cylindrical recess which forms a collar portion depending from said saddle;
  shaping an end portion of said metal mounting rod into a flattened configuration having a width exceeding the diameter of said rod;
  positioning said rod in one of said mold portions with said shaped end portion being disposed within said recess; and
  closing said mold portions and introducing a fluent plastic material into said cavity to fill said cavity and to thereby create said saddle;
    said introduced plastic material filling said recess and surrounding and engaging against the exterior of said shaped end portion of said rod so that when said plastic material solidifies, said collar portion of said saddle and said shaped end portion of said rod are tightly interconnected.

References Cited

UNITED STATES PATENTS 2,931,423  4/1960  Kalter _____ 297—195 X
3,201,172  8/1965  Bliss _____ 297—445

FOREIGN PATENTS 710,400  6/1954  Great Britain.
980,781  4/1965  France.

JAMES T. McCALL, Primary Examiner

U.S. Cl. X.R.

287—54; 297—203